United States Patent
Szajnowski et al.

(10) Patent No.: US 6,539,320 B1
(45) Date of Patent: Mar. 25, 2003

(54) TIME DELAY DETERMINATION AND DETERMINATION OF SIGNAL SHIFT

(75) Inventors: Wieslaw Jerzy Szajnowski, Guildford (GB); Paul A. Ratliff, Carshalton (GB)

(73) Assignee: Mitsubishi Denki Kabushiki Kaisha (JP)

(*) Notice: Subject to any disclaimer, the term of this patent is extended or adjusted under 35 U.S.C. 154(b) by 0 days.

(21) Appl. No.: 09/831,574

(22) PCT Filed: Dec. 24, 1999

(86) PCT No.: PCT/GB99/04437
§ 371 (c)(1),
(2), (4) Date: May 11, 2001

(87) PCT Pub. No.: WO00/39643
PCT Pub. Date: Jul. 6, 2000

(30) Foreign Application Priority Data

Dec. 24, 1998 (GB) .............................. 9828693

(51) Int. Cl.$^7$ ................................. G06F 1/04
(52) U.S. Cl. ............... 702/79; 702/57; 702/69; 702/72; 702/78
(58) Field of Search ............... 702/57, 69, 72, 702/79, 74, 78, 110, 125, 149, 176–178, 189; 377/17

(56) References Cited

U.S. PATENT DOCUMENTS

| | | | |
|---|---|---|---|
| 4,097,801 A | 6/1978 | Freeman et al. ............. | 324/188 |
| 4,468,746 A | * 8/1984 | Davis .......................... | 364/569 |
| 4,613,951 A | * 9/1986 | Chu ............................ | 364/569 |
| 4,714,927 A | 12/1987 | Siegel et al. ................ | 342/160 |
| 5,214,784 A | * 5/1993 | Ward et al. .................. | 395/800 |
| 5,982,712 A | * 11/1999 | Smith .......................... | 368/120 |

FOREIGN PATENT DOCUMENTS

| | | |
|---|---|---|
| EP | 0 488 739 A1 | 6/1992 |
| EP | 0 679 906 A1 | 11/1995 |
| GB | 1 556 301 | 11/1979 |
| JP | 58-156872 A | 9/1983 |
| JP | 60-29688 A | 2/1985 |
| WO | WO 98/11451 A1 | 3/1998 |

* cited by examiner

*Primary Examiner*—Marc S. Hoff
*Assistant Examiner*—Felix Suarez
(74) *Attorney, Agent, or Firm*—Rothwell, Figg, Ernst & Manbeck (57) ABSTRACT

The delay between a first signal and a second signal is evaluated by deriving from the first signal substantially aperiodic events, possibly by using a zero-crossing detector on a random signal, and using these events to define respective segments of the second signal. The segments are combined, e.g., by averaging, to derive a waveform which includes a feature representing coincidences of parts of the second signal associated with the derived events. The delay is determined from the position within the waveform of this feature.

20 Claims, 9 Drawing Sheets

FIG. 7
OUTPUT OF
THE TIME-DELAY
DISCRIMINATOR

FIG. 8
OUTPUT OF
THE TIME-DELAY
DISCRIMINATOR

TIME DELAY DETERMINATION AND DETERMINATION OF SIGNAL SHIFT

The present invention relates to the determination of the time delay between at least two signals. The described techniques can also be applied generally to the determination of the amount by which a signal is shifted relative to another signal.

One obvious application of time-delay determination is the synchronisation of different processes or functions being performed in a complicated engineering system, especially a communication system. There are many other practical applications of time-delay determination; for example, radar and sonar systems. Also, in some industrial and biomedical applications, where a distance is known, but the velocity of a waveform, associated with some phenomenon or process, is required, this can be estimated by determining the time required for this phenomenon or process to travel the known distance.

One conventional method of determining a time delay $\Delta t$ is to estimate the standard cross correlation function $$R_{xy}(\tau)=(1/T)\int x(t).y(t+\tau)dt=(1/T)\int x(t-\tau).y(t)dt$$

where the integral is evaluated over the observation interval of duration T and for a range of hypothesised time delays $\tau_{min}<\tau<\tau_{max}$. The value of argument $\tau$, say $\tau_0$, that maximises the cross correlation function $R_{xy}(\tau)$ provides an estimate of the unknown time delay $\Delta t$.

In general, the operation of cross correlation comprises the following three steps:

1. delaying the reference signal x(t) by $\tau$;
2. multiplying the values of a received signal y(t) and delayed reference x(t);
3. integrating the product obtained in step 2 over a specified observation time interval T.

Figure 1:
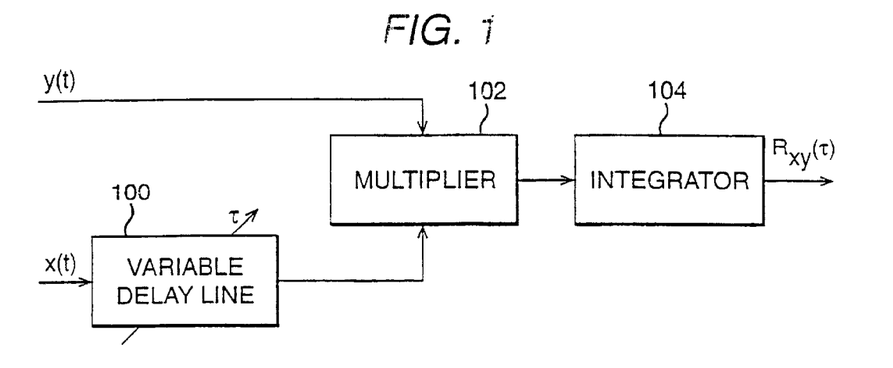
FIG. 1 is a block diagram of a standard cross-correlator system.
Figure 2:
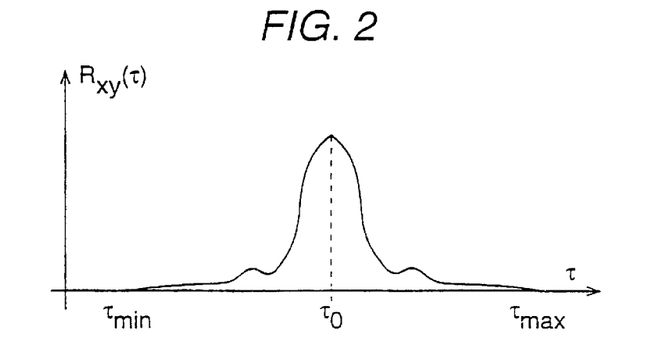
FIG. 2 shows an example of a typical cross correlation curve.

A block diagram of a standard cross-correlator system is presented in FIG. 1. The system comprises a variable delay line 100, a multiplier 102 and an integrator 104. An example of a typical cross correlation curve, with its maximum determining the time-delay estimate $\tau_0$, is shown in FIG. 2.

The illustrated system performs the required operations and functions serially; however parallel systems are also known, in which for example the single variable delay line is replaced by a tapped ("bucket-brigade"-type) delay line, the taps providing incremental delays feeding respective multipliers whose outputs are fed to respective integrators.

It should be pointed out that the cross-correlation operation can be performed either in the time domain, as discussed above, or in the frequency domain.

The observed cross-correlation curve usually contains errors associated with random fluctuations in the signal itself as well as errors due to noise and interference effects. As a result, the task of locating the cross-correlation peak is rather difficult to carry out in practice. Even when the peak is well defined, its position is usually found by evaluating the cross-correlation function at several points and calculating corresponding differences to approximate the derivative of the cross correlation function. When this procedure is to be used in a tracking system, the additional operations required are computationally burdensome and inconvenient at best.

Figure 3:
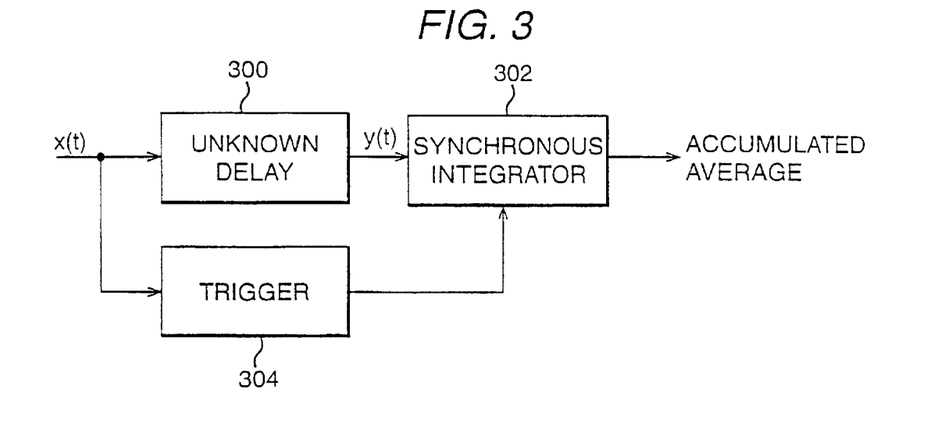
FIG. 3 is a block diagram of an active system which employs synchronous integration to determine unknown time delay.
Figure 4:
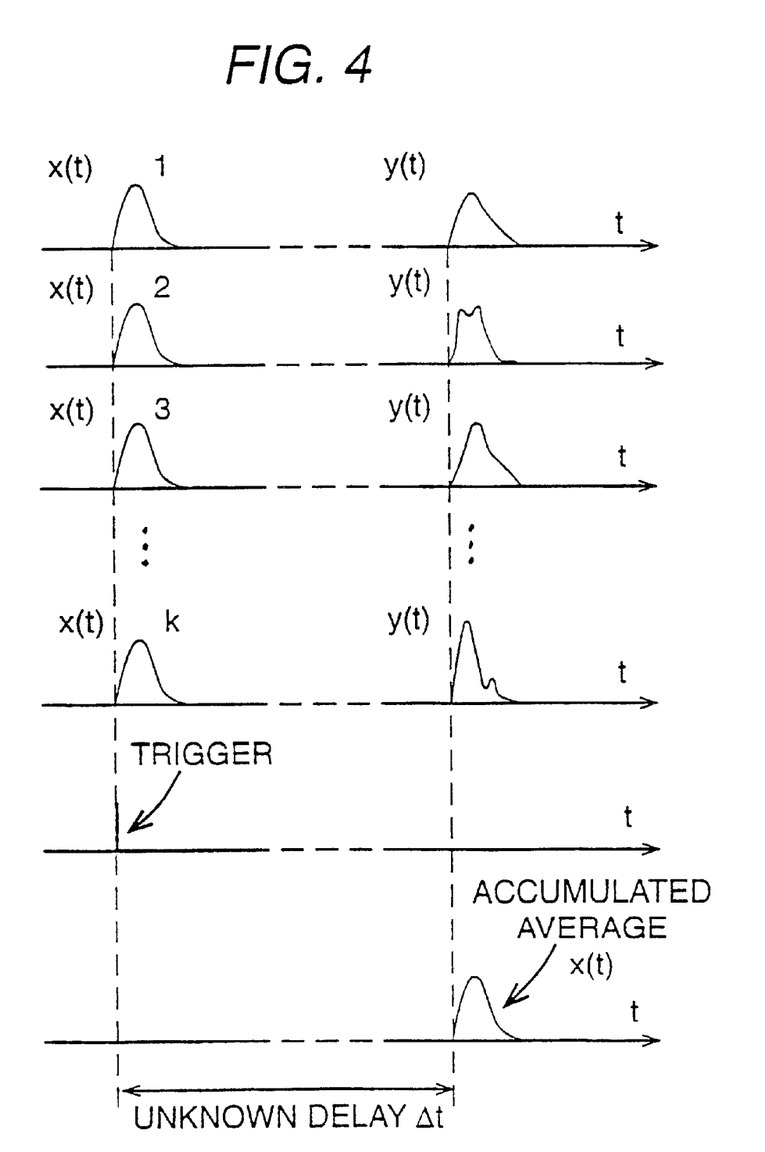
FIG. 4 shows an example of typical waveforms and operations performed by a synchronous integrator to determine unknown time delay.

An important class of active methods for determining an unknown time delay is based on synchronous integration. FIG. 3 is a block diagram of an active system for determining time delay. The transmitted signal x(t) is delayed an unknown amount by signal path 300, and integrated by synchronous integrator 302 in synchronism with the transmitted signal x(t). The integration process in a synchronous integrator is initiated and controlled by a train of trigger pulses obtained by a trigger generator 304 from the signal x(t) itself. Known synchronous-integration systems employ repetitive composite signals which consist of a number of suitable identical waveforms. FIG. 4 shows an example of typical waveforms and operations performed by a synchronous integrator. In this case, each trigger pulse coincides with the leading edge of the signal waveform being transmitted. The output signal waveform y(t) is a time-delayed replica corrupted by noise and interference. If the total number K of integrated waveforms is sufficiently large, then the accumulated average, observed at the output of the synchronous integrator, will have the same shape as that of the repeatedly transmitted waveform x(t). The unknown time delay $\Delta t$ can then be determined from the time difference between the occurrence of the trigger pulse and the leading edge of the accumulated average.

It would be desirable to provide an improved technique for determining time delay.

Aspects of the present invention are set out in the accompanying claims.

In a further aspect of the present invention, a time delay is measured between two signals, which correspond to each other but need not be identical. One of the signals is processed in order to determine a sequence of events which are separated by non-uniform intervals. The signal is preferably so designed that the events define an at least substantially aperiodic succession. Segments of the second signal are acquired at intervals corresponding to the intervals between the successive events derived from the first signal. The segments are combined. At a position within the combined segments which corresponds to the time shift between the first and second signals, the parts of the second signal which correspond to the events of the first signal will be combined together. This position can be determined from the combined segments. Accordingly, it is possible to determine that time shift which corresponds to the delay between the signals.

Preferably, the events are associated with edges of a binary signal, more preferably zero crossings of a bipolar signal so that the combined samples either average out to zero (if the time-shift does not correspond to the delay between the signals), or represent an odd function (if the time shift corresponds to the delay). By searching for the odd function, the correct delay time can be determined.

In preferred embodiments of the present invention described below a time-delay discriminator employs implicit sampling. Conventional signal processing techniques are based on observations obtained by sampling a signal of interest at predetermined (and generally equally-spaced) time instants (e.g., Nyquist sampling), independent of the values assumed by that signal (so-called explicit sampling). In contrast to explicit sampling, implicit methods of sampling make use of the time instants at which the signal of interest (or another signal associated with it) assumes some predetermined values.

In the preferred embodiments, the sequence of events is derived from a substantially aperiodic waveform, which may also be a chaotic waveform or other random or pseudo-random waveform, with suitable temporal characteristics. The waveform is utilised to produce a series of time marks, corresponding to the events, which can be regarded as a substantially random point process. Preferably, but not necessarily, these time marks are obtained by using suitably selected time instants at which the waveform crosses a predetermined constant level (for example zero level) or a level varying in time in some specified fashion. Zero-level crossings with positive slope will be referred to as zero upcrossings; similarly, zero-level crossings with negative slope will be referred to as zero downcrossings. Zero crossings (of real or complex waveforms) permit accurate and unambiguous representations of time instants.

The series of time marks obtained from the waveform is then utilised to construct a binary waveform in such a way that the time marks constitute the transition (switching) instants between two suitably selected voltage levels. Consequently, all relevant time information needed for time-delay determination will be encapsulated in the series of transition instants of the binary waveform. When a binary waveform is used, the potential additional uncertainty associated with the time-varying amplitude of a waveform is eliminated which results in more efficient and reliable time-delay determination. In particular, a symmetric (bipolar) binary waveform with random transition times may be regarded as a particularly desirable signal for the purpose of time-delay determination because its temporal structure is purely random, i.e. aperiodic and irregular, while its amplitude structure is very simple.

Such an arrangement is not however essential. It is important that the events, or time marks, occur at non-uniform intervals. These intervals could be integer multiples of a common period, e.g. a clock cycle, and indeed this may be likely in a digital system. The intervals need not, however, be wholly aperiodic; they could for example form a sequence which repeats (derived from a pseudo-random signal), but this is still substantially aperiodic so long as the repetition period is sufficiently long as to avoid ambiguous results (i.e. longer than the range of delays to be measured).

The invention may be embodied in an obstacle detection apparatus or other radar device, using for example a microwave carrier for transmitting one of the signals, and determining the delay between that signal and the received reflection.

Although a binary waveform constructed from a series of random time marks is used for time-delay determination, the random waveform actually employed for modulation of the carrier may in fact differ from this binary waveform because only time marks extracted from this random waveform are used. As a result, as long as the waveform can provide suitable time marks, its other parameters, e.g. those affecting its shape, may be chosen (or even 'engineered') according to some other criteria, such as:

1. constant envelope (i.e. a continuous signal, such as a sine wave) for efficient power transmission;
2. a form suitable for modulation with reduced complexity;
3. noise-like appearance for low probability of interference.

It is preferred that the modulation of the carrier be such as to avoid corruption of the time information, such as might occur if, e.g., a simple pulse is transmitted at each time instant, and the transmission path is such that the amplitude rise time can be distorted.

An arrangement embodying the invention will be described by way of example with reference to the accompanying drawings, wherein.

An embodiment of the invention, in the form of an obstacle-detection microwave radar, will be described with reference to FIG. 5, which is a block diagram of the obstacle-detection microwave radar.

The microwave radar comprises a random signal generator 1 that produces substantially continuous random waveforms $x(t)$ and $z(t)$ with suitable bandwidth and other characteristics. These may be identical or, as discussed below, different. For the purposes of the present embodiment it is assumed they are identical.

The radar also has a microwave oscillator 2 that generates a sinusoidal signal with required carrier frequency, a modulator 3 that modulates one or more of the parameters (for example amplitude, phase, or frequency) of the carrier signal with the random waveform $z(t)$, a power amplifier (PA) 4 that amplifies the modulated carrier signal to a required level, a microwave transmit antenna (TA) 5 that radiates an electromagnetic wave representing the modulated carrier signal towards an obstacle 6, a microwave receive antenna (RA) 7 that receives an electromagnetic wave reflected back by the obstacle 6, an input amplifier (IA) 8 that amplifies a signal provided by the receive antenna (RA) 7, and a demodulator 9 that processes jointly the reference carrier signal supplied by the oscillator 2 and a signal supplied by the input amplifier (IA) 8 to reconstruct a time-delayed replica $y(t)$ of the transmitted random waveform $z(t)$.

The random waveform $x(t)$ and the time-delayed replica $y(t)$ are then processed jointly by a time-delay discriminator 10 during a specified observation time interval to produce an estimate of the unknown time delay that is proportional to the distance (range) between the radar and the obstacle 6. Next, time-delay estimates together with the values of the corresponding observation time intervals are supplied to a data processor 11 that determines the distance (range) from the obstacle 6 and, if appropriate, the data processor 11 may also determine the velocity of this obstacle.

Figure 6:
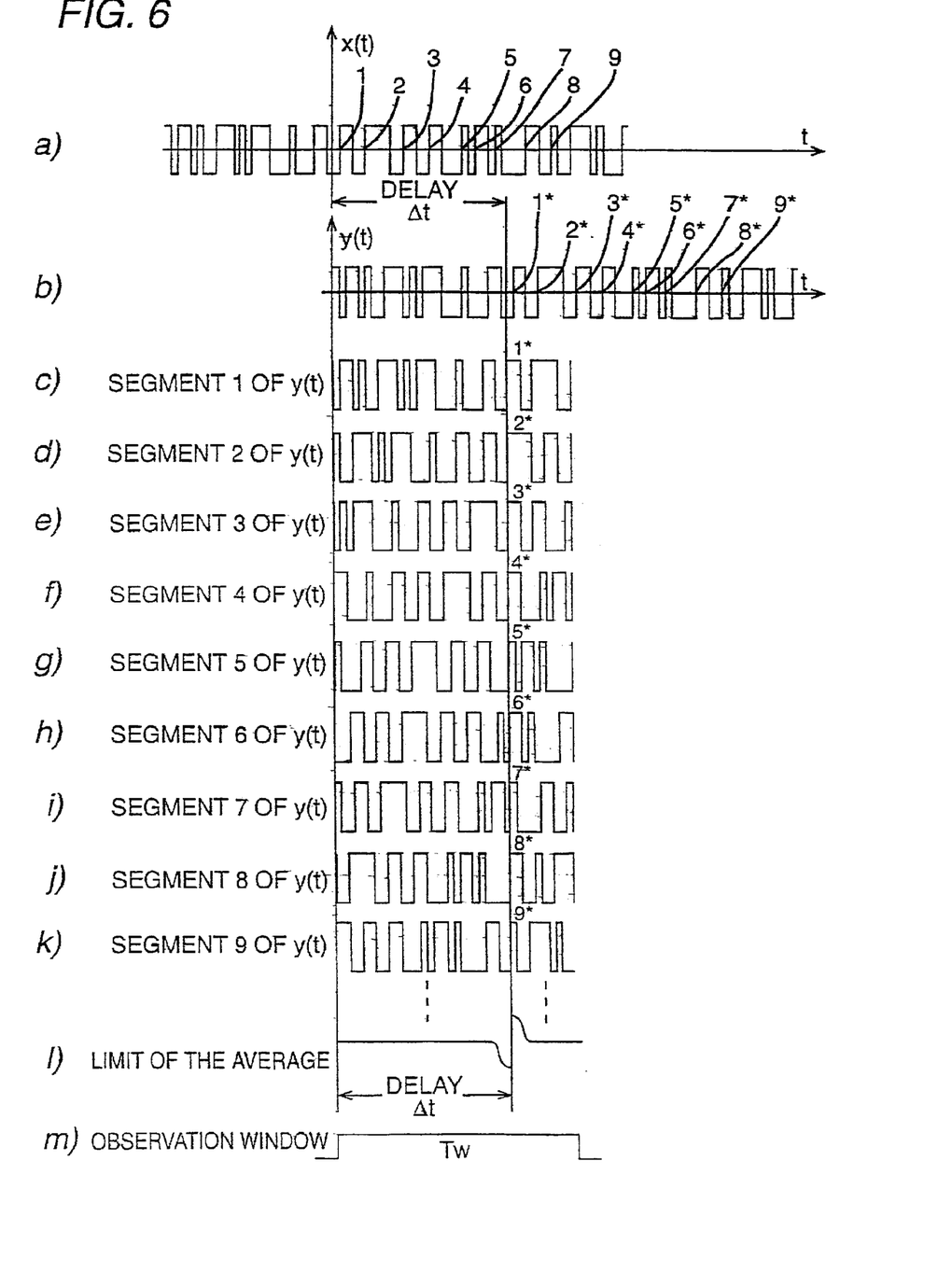
FIG. 6 is a waveform diagram illustrating an implicit averaging technique used in the embodiment of the invention.

The waveforms $x(t)$ and $y(t)$ are shown in FIG. 6. The waveform $x(t)$ is a symmetric random binary bipolar waveform which is in this embodiment also the waveform $z(t)$ transmitted towards an obstacle. All the relevant time information is encapsulated in the set of random zero crossings of x(t). For illustrative purposes, some selected successive zero upcrossings of the waveform x(t) are marked in FIG. 6a by numbers from 1 to 9. The binary waveform y(t), reflected back by an obstacle and shown in FIG. 6b, is a time-delayed replica of the transmitted binary waveform x(t). Consequently, the original pattern of random zero upcrossings associated with x(t) has been shifted in time by the delay $\Delta t$. In particular, the pattern of upcrossings, 1 to 9, of x(t) has been delayed by $\Delta t$ to form the corresponding pattern of upcrossings of y(t), marked in FIG. 6b by numbers from 1* to 9*.

To illustrate the technique used by the time-delay discriminator 10 of this embodiment, consider the construction of plurality of waveform segments of waveform y(t) as follows:

1. Select an observation window Tw of duration equal to (or greater than) the maximum expected value $\Delta t_{max}$ of time delay to be determined; an example of an observation window is shown schematically in FIG. 6m;
2. Select a zero upcrossing of x(t) and select a segment of y(t) of duration Tw, starting from the time instant coinciding with this selected zero upcrossing. For example, when zero upcrossing 1 of x(t) has been selected, segment 1 of y(t), corresponding to this zero upcrossing, will have the form shown in FIG. 6c. As seen, segment 1 of y(t) contains the zero upcrossing 1* which is delayed with respect to the zero upcrossing 1 of x(t) by the unknown time delay $\Delta t$;
3. Repeat step 2 by selecting different successive (not necessarily consecutive) zero upcrossings of x(t) to construct segments of y(t) corresponding to these selected zero upcrossings. If the duration Tw of the observation window is chosen in accordance with the rule given in step 1, i.e., Tw>$\Delta t_{max}$, then each segment of y(t) will necessarily contain a zero upcrossing which is a time-delayed replica of the selected zero upcrossing of x(t) used to construct this particular segment. Because any selected zero upcrossing of x(t) defines the starting point of the corresponding segment of y(t), the corresponding zero upcrossing of y(t) will appear at the time instant which is equal exactly to $\Delta t$, i.e., the unknown time delay. FIG. 6c to FIG. 6k show all nine segments of y(t), corresponding to selected zero upcrossings of x(t), from 1 to 9. As seen, when all the segments of y(t) are aligned together in time, the corresponding upcrossings of y(t), marked by numbers from 1* to 9*, occur synchronously at the time instant $\Delta t$.

The number of constructed segments is equal to the number of zero upcrossings selected for processing.

Consider the case when the number of segments is very large and assume that the average number of zero crossings per segment (i.e., during the observation window Tw) is much greater than one. The average of these segments will assume a distinctive shape, shown schematically in FIG. 6l. From this it will be observed that a distinctive feature occurs at a delay time $\Delta t$, representing the delay time between the original signal and its delayed replica It will therefore be appreciated that if the y(t) waveform is sampled at a delay time corresponding to $\Delta t$, and the samples are summed or averaged, this distinctive feature will be found; however, if other delay times are selected, there will be no correlation between the sample points and the y(t) signal, so the average will tend to zero. FIG. 6l is a representation of a combination formed by taking segments of the signal y(t) and overlapping them. It is to be noted that although in this preferred embodiment the segments also occupy, within the signal y(t), overlapping time periods (because the intervals between successive events are generally shorter that the window Tw), this is not necessary.

Although the detailed shape of the average of FIG. 6l will depend on the statistical properties of the binary waveform under consideration, generally the following will apply:

1. The average is an odd function; the sharp transition between the negative peak and the positive peak occurs at the time instant specified by the delay $\Delta t$ between the original binary waveform and its delayed replica; the magnitude of the two opposite peaks is the same and equal to the amplitude of the delayed binary waveform;
2. At the time instants far away from the transition time instant the average is equal to zero because the conditioning on zero crossing has no longer any effects and the average is now equal to the mean value (i.e., zero in this case) of the binary waveform under consideration.

It can be shown theoretically that when the number of averaged segments tends to infinity, the shape of their average approaches the negated derivative of the correlation function of the underlying binary process. Because the correlation function of any binary process must have a cusp at zero delay, the derivative is discontinuous there.

Figure 7:
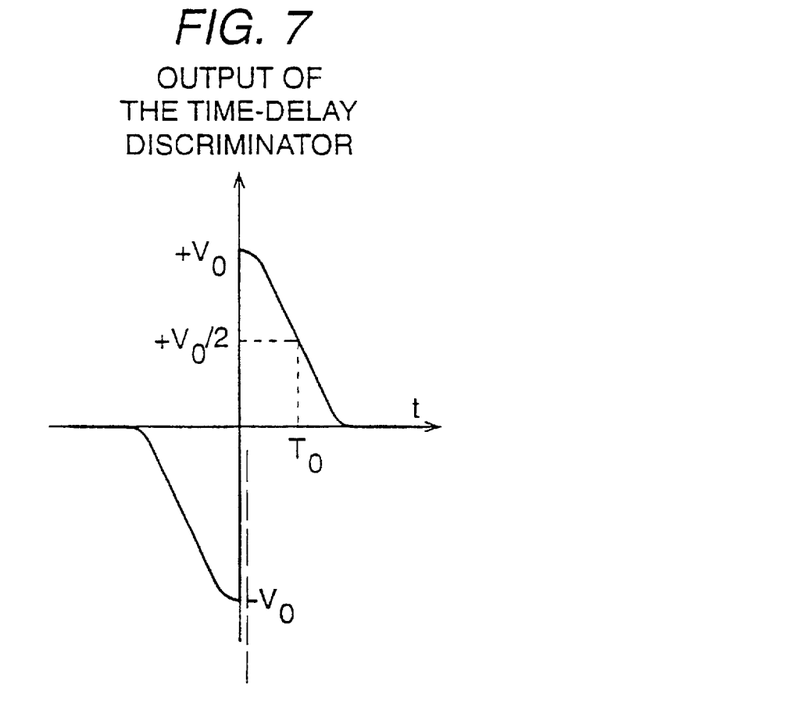
FIG. 7 shows a typical implicit average of a binary waveform obtained from a Gaussian noise process with Gaussian power spectral density.

FIG. 7 shows approximately the ideal shape of the average of FIG. 6l in more detail, assuming a Gaussian random noise process, with a Gaussian correlation function. For a rms bandwidth of 100 Mhz, the width of each of the two parts is equal to 5 ns and the peak value $V_0$ is reduced to $V_0/2$ at the time instant $T_0$=2.5 ns which corresponds to a distance of 37.5 cm.

When there is no noise or interference, the time-delay determination can be performed with substantial accuracy as soon as the number of integrated segments reaches a relatively small number (e.g., sixteen). While the two peak values, +$V_0$ and -$V_0$, of the average are not affected by the number L of averaged segments, the values far away from these peaks are no longer zero but they will fluctuate with the standard deviation of $V_0\sqrt{L}$.

Figure 8:
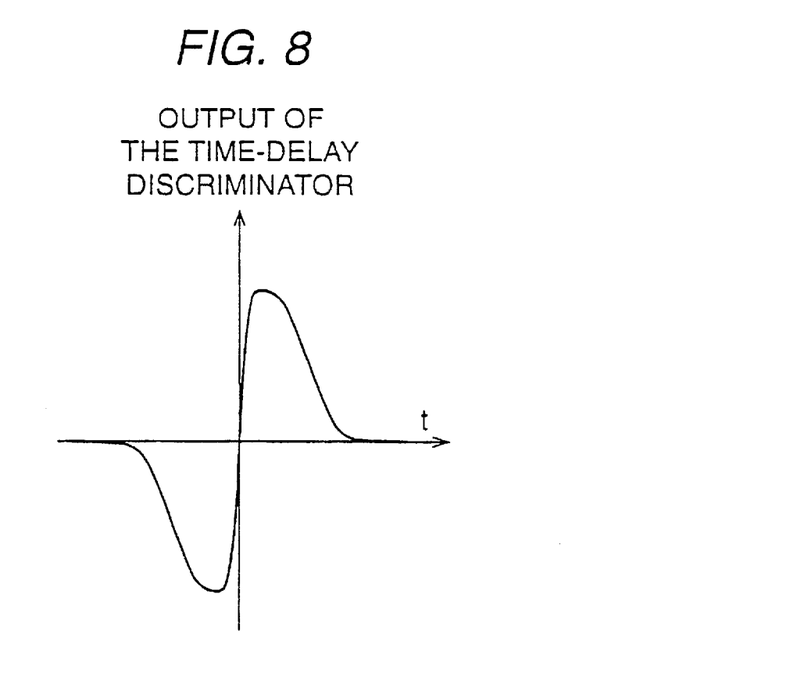
FIG. 8 illustrates the effects of bandwidth limitation on the shape of the implicit average.

In practice, the bandwidth limitation of the signal processing and transmission blocks will reduce the peak values of the average, broaden its shape and introduce a finite transition time; these effects are illustrated in FIG. 8.

Figure 5:
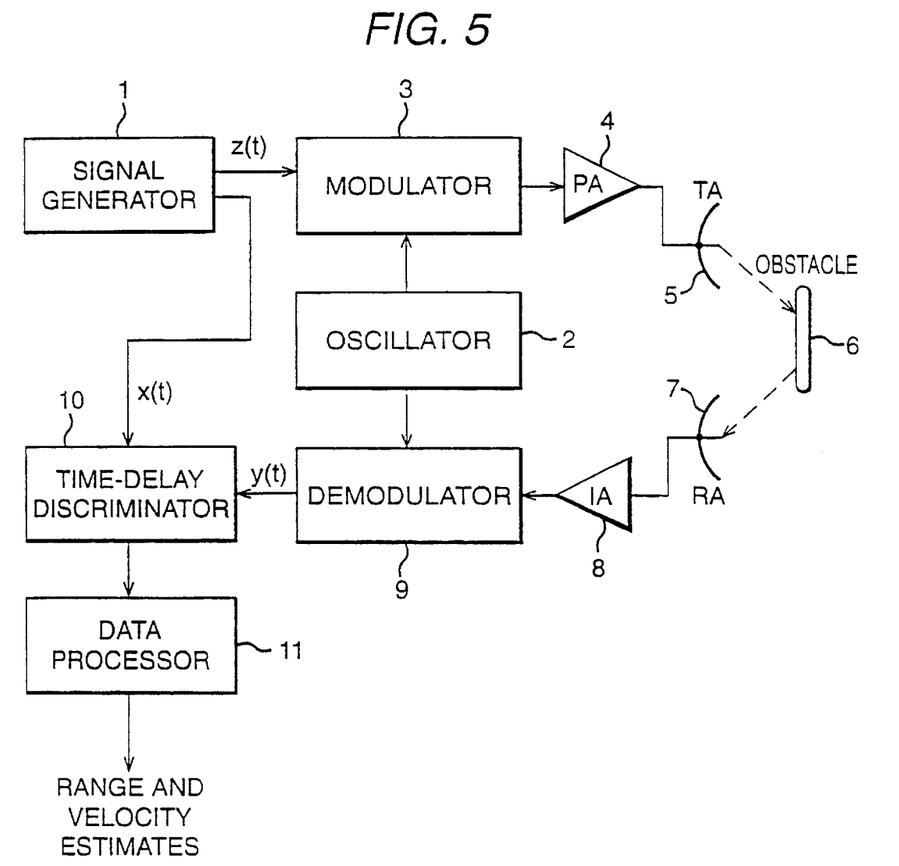
FIG. 5 is a block diagram of an obstacle-detection microwave radar forming an embodiment of the invention.
Figure 9:
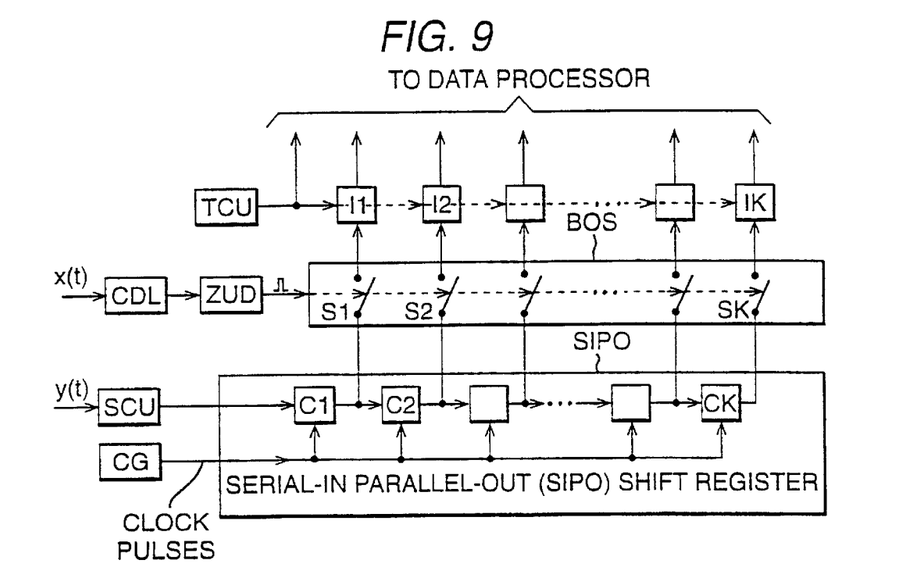
FIG. 9 is a block diagram of a time-delay discriminator used in the embodiment of the invention.

FIG. 9 is a block diagram of a practical time-delay discriminator 10 for use in the embodiment of FIG. 5. The analogue signal y(t) supplied by the demodulator is the sum of noise n(t) and the transmitted random signal z(t) that has been attenuated by the factor of a and delayed by $\Delta t$; hence $$y(t)=a.z(t-\Delta t)+n(t).$$

The signal y(t) is converted by a signal conditioning unit (SCU) into a suitable (analogue or digital) form and then applied to the input of a serial-in parallel-out (SIPO) shift register.

The SIPO shift register consists of K storage cells, C1, C2 . . . , CK. Each cell has an input terminal, an output terminal and a clock terminal. The cells are connected serially so that each cell, except for the first one (CI) and the last one (CK), has its input terminal connected to the output terminal of a preceding cell and its output terminal connected to the input terminal of a succeeding cell. The input terminal of cell C1 is used as the serial input of the SIPO shift register. The output terminals of all K cells are the parallel output terminals of the SIPO shift register. All clock terminals of the cells are connected together to form the clock terminal of the SIPO shift register.

A sequence of suitable clock pulses is provided by a clock generator CG. When at time instant to a clock pulse is applied to the clock terminal of the SIPO shift register, the datum stored in each cell is transferred (shifted) to and stored by the succeeding cell; cell C1 stores the value $y(t_0)$ of the input signal y(t).

The shift register can be implemented either as a digital device or an analogue device, for example, in the form of a bucket-brigade charge-coupled device (CCD). Preferably, the SIPO shift register will consists of binary flip-flops. Preferably, the input terminal of this register will be driven by a suitable binary two-level waveform supplied by the signal conditioning unit (SCU) which may comprise a hard limiter. A hard limiter has a step-like transfer function such that a variable-amplitude input is transformed into a two-level output.

The parallel outputs of the SIPO shift register are connected through a bank BOS of K switches (S1. S2, ..., SK) to K averaging or integrating units, I1, I2, IK, that accumulate data supplied by the SIPO shift register. The switches, normally open, are closed when a suitable signal is applied to their control input. The time interval during which the switches are closed should be sufficiently long so that each new incremental signal value can be acquired with minimal loss. The time instants at which the switches are closed and new data supplied to the integrating units are determined by a zero upcrossing detector (ZUD) that detects the upcrossings of zero level of the reference random binary signal x(t) delayed by a constant-delay line CDL, thus achieving asynchronous operation. The value of this constant delay is equal to or greater than the expected maximum value $\Delta t_{max}$ of time delay to be determined. It should be noted that the integrators receive the incremental input values from the SIPO shift register in non-uniform manner, at the time instants coinciding with zero upcrossings of the delayed reference signal x(t).

Each time a zero upcrossing occurs, there appears transiently on the integrator inputs a representation of a respective segment of the signal y(t), similar to the segments shown in FIGS. 6c to 6k. The integrators thus combine these segments to produce a representation of a combined waveform, like that of FIG. 6l.

The timing control unit (TCU) determines the data transfer rate to the data processor 11 by initiation and termination of the averaging or integration processes performed by the K integrators I1, I2, ..., IK. The averaging or integrating functions may be implemented either as a moving or standard average with initial value zero. These may be circumstances in which weighting is desirable, i.e. wherein the averages are weighted averages.

The signals obtained at the outputs of the integrators I1, I2, ..., IK and used by the data processor represent the implicit average of the form similar to that shown in FIG. 8. The operations performed by the data processor can be summarised as follows, and can be implemented easily by anyone skilled in the art;

two suitable thresholds are used to detect the two peak values (a maximum and a minimum) of the implicit average, exploiting the fact that the peak separation is substantially known;

the time delay from the location of the zero crossing situated between these two peaks of opposite polarity is determined;

the distance to the obstacle is determined from the time delay.

The data processor may also determine the velocity of the obstacle from the change of distance with time.

Figure 10:
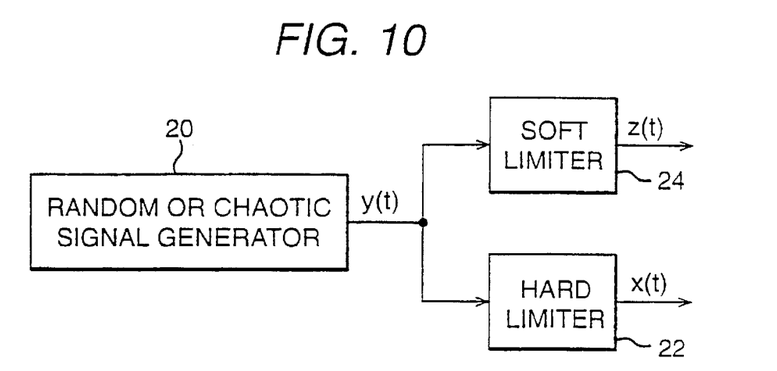
FIG. 10 is a block diagram showing an example of an arrangement for obtaining two different waveforms with coincident zero crossings.

An important advantage of the present embodiment is that the signals can be separately optimised for both of the two basic functions of (a) providing a random waveform, for time delay determination and (b) power transmission. A modification which can be applied to the radar system shown in FIG. 5 is presented in FIG. 10 where there are shown two separate signal paths from the signal generator: one for signal z(t) employed for modulation and another one for reference binary waveform x(t) used for time-delay determination. For illustrative purposes, one example of obtaining two differing signals with coincident zero crossings from the same underlying waveform is presented in FIG. 10. A random or chaotic waveform generator 20 produces a signal v(t) which is passed through a hard limiter 22 to produce the random binary waveform x(t) used as a reference for time-delay determination. The waveform z(t) employed for modulation is obtained at the output of a soft limiter 24 driven by v(t). The soft limiter 24, which may be a slicer, has a transfer function such that a variable-level input will give rise to an output which is limited to predetermined minimum and maximum values, but which may vary continuously between these values. Although the waveform z(t) will retain most of the noise-like features of x(t), the dynamic range of z(t) will be controlled by the shape of the transfer characteristic of the soft limiter, thus facilitating the modulation process.

Figure 11:
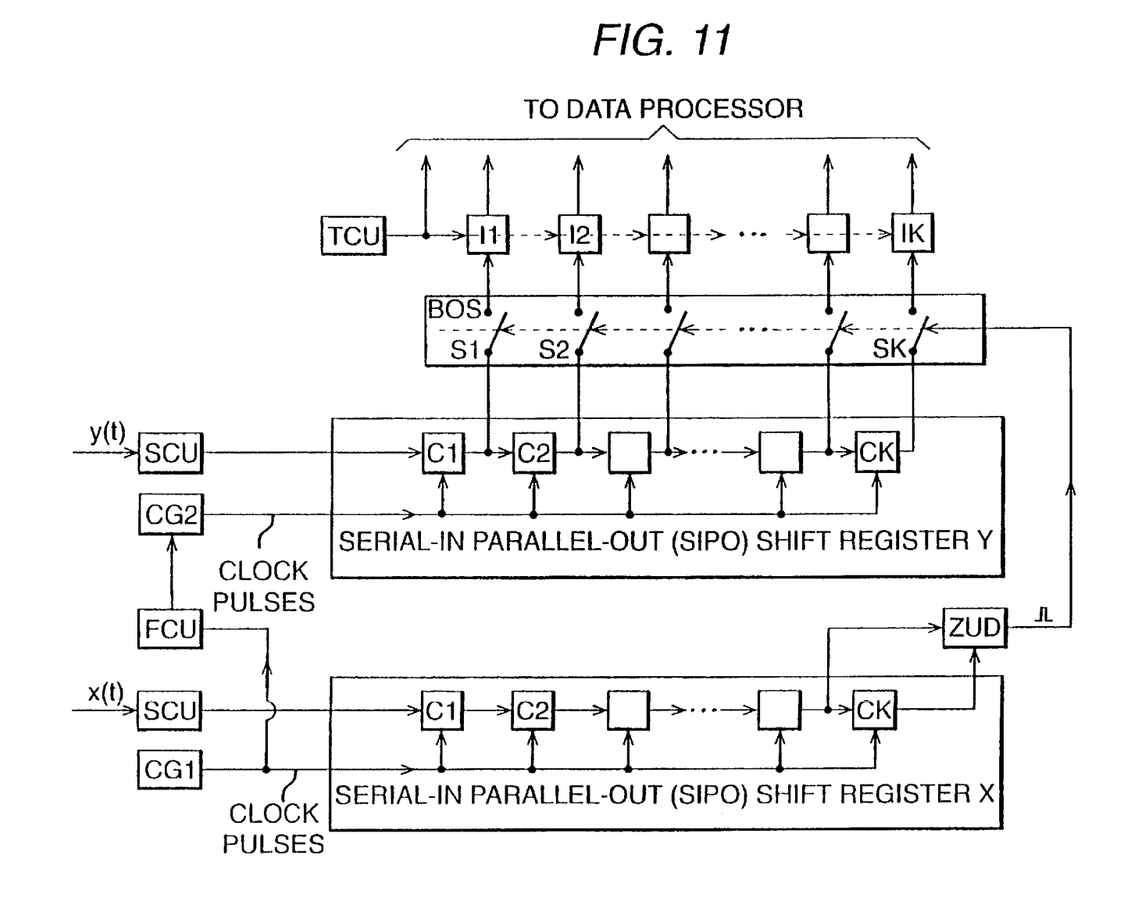
FIG. 11 is a block diagram of an alternative time-delay discriminator.

The constant-delay line (CDL) of FIG. 9 can be implemented in many different ways. FIG. 11 shows another time-delay discriminator, indicating a specific technique for implementing the delay produced by the CDL of FIG. 9. In this embodiment:

1. The reference waveform x(t) is applied through an appropriate signal conditioning unit SCU to a separate SIPO shift register X.
2. A zero upcrossing detector (ZUD) is connected to the input and the output of cell CK of SIPO register X; a zero upcrossing is detected when the output of CK is positive while its input is negative.
3. The clock inputs of SIPO registers X and Y may be driven by two separate clock generators (CG1 and CG2) with different frequency; the frequency of CG2 can be offset with respect to that of CG1 either by a constant or varying value by employing a suitable frequency control unit (FCU); in general, such an arrangement will improve the resolution of time-delay determination.

Figure 12:
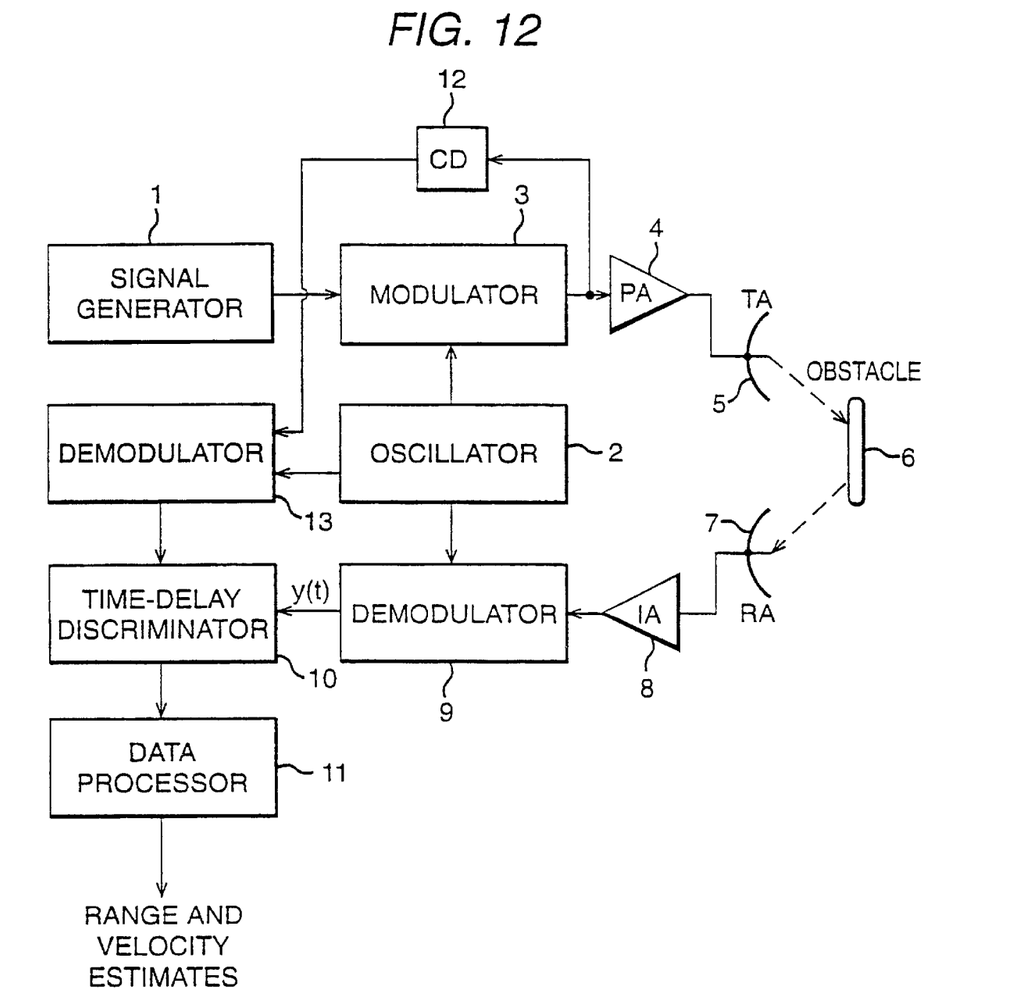
FIG. 12 is a block diagram of another embodiment of the invention.

FIG. 12 shows another obstacle-detection system in accordance with the present invention. The modifications of the basic system, shown in FIG. 5, are as follows:

1. A constant delay (CD) 12 operating in the microwave region has been added to obviate the need for the constant-delay line (CDL) used in the system shown in FIG. 9.
2. A second demodulator 13 has been added to produce a reference waveform used by the time-delay discriminator 10.

Clearly, it would be possible to use zero downcrossings instead of, or as well as, zero upcrossings. The accuracy of time-delay determination would be improved if all zero crossings (upcrossings and downcrossings) were used for implicit averaging because the number of integrated signal segments will double. However, the achieved reduction of noise level due to self-noise and other interference will be less than double because of possible correlation between the adjacent zero crossings.

It would be possible to use both zero upcrossings and zero downcrossings by having two identical systems, each intended for processing zero upcrossings, used in parallel;

while one is driven by the waveform x(t), the other is driven by −x(t). The outputs of integrators of the two systems are then passed to a data processor for time delay determination. It is also possible to employ a single bank of integrators with suitable control of input signals.

Figure 13:
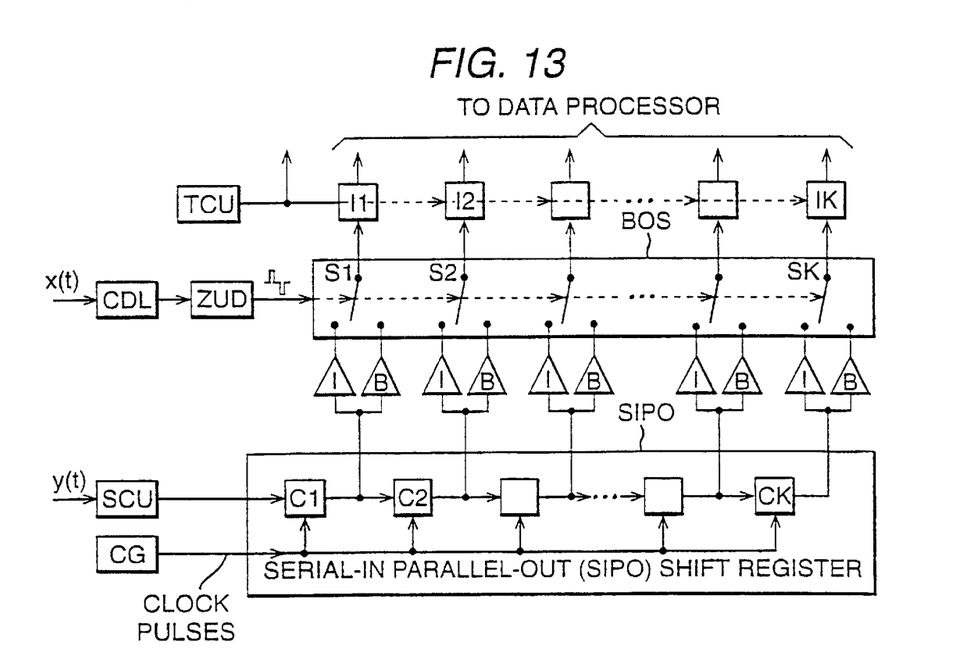
FIG. 13 is a block diagram showing a time-delay discriminator processing zero upcrossings and zero downcrossings.

FIG. 13 is a block diagram of a further time-delay discriminator 10 showing an alternative technique for using zero upcrossings as well as zero downcrossings. The modifications with respect to the time-delay discriminator shown in FIG. 9 are as follows:

1. A zero upcrossing detector is now replaced by a zero crossing detector (ZCD) which produces two different outputs depending on the type of detected zero crossing.
2. In the bank of switches (BOS), switches with two inputs have been replaced by switches with three inputs.
3. The output signals of the SIPO register are connected to the integrators through a combination of inverters, buffers and switches to perform the following functions:
    when a zero upcrossing is detected, the outputs of the SIPO register are transferred to the integrators through buffers B;
    when a zero downcrossing is detected, the outputs of the SIPO register are transferred to the integrators through inverters I.

It is evident that other variants of the time-delay discriminator can be developed by modifying and combining various blocks of the systems discussed above.

It is known that some types of microwave power generators can be modified to operate in a chaotic mode, thus producing a wideband microwave signal with noise-like appearance which can be utilised directly in an obstacle-detection system in accordance with the invention.

Figure 14:
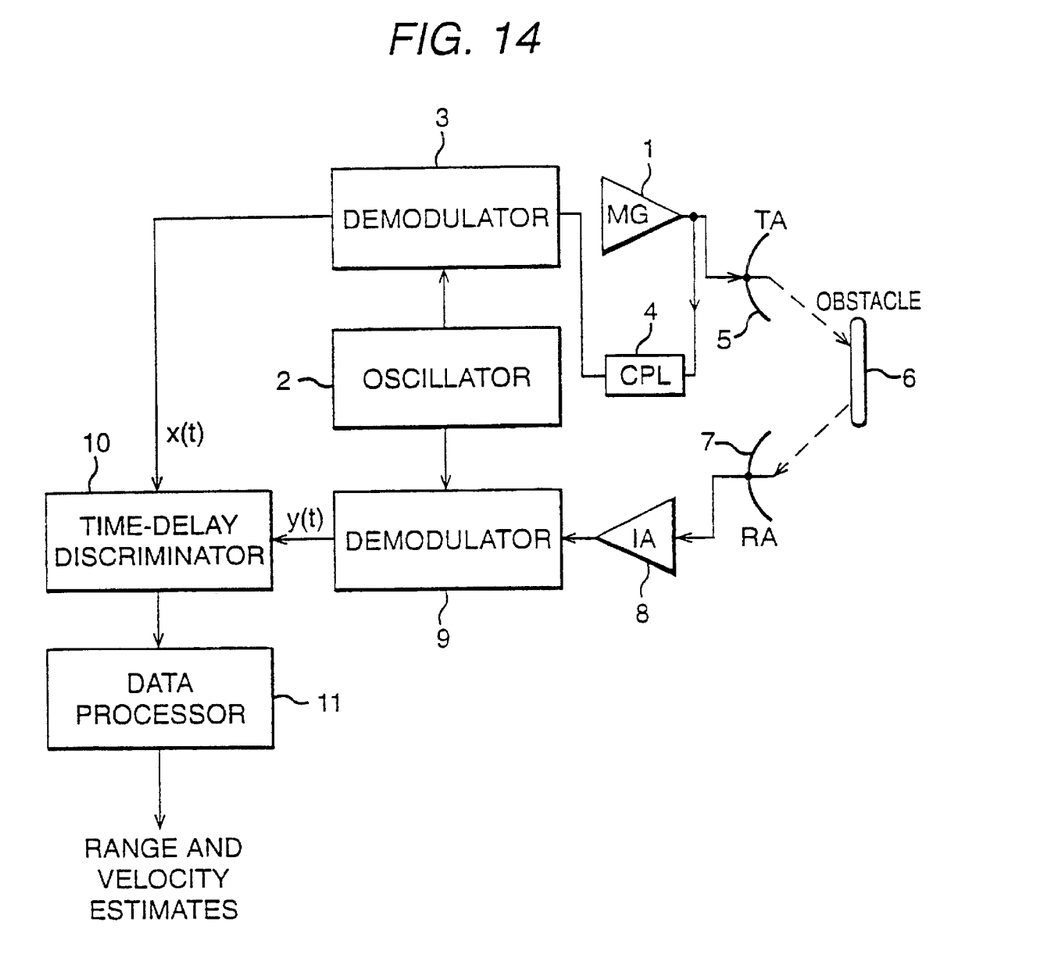
FIG. 14 is a block diagram of a further embodiment of the invention.

FIG. 14 is a block diagram of such a system, which employs a microwave noise or chaotic signal source with an output power level suitable for intended applications. The modifications with respect to the system shown in FIG. 5 are as follows:

1. The signal generator 1, the modulator 3 and the power amplifier 4 employed by the system in FIG. 5 have been replaced by a microwave power generator (MG) 1, a microwave coupler (CPL) 4 and a demodulator 3, as shown in FIG. 14.
2. A reference signal x(t) required by the time-delay discriminator 10 is now provided by a demodulator 3 that processes jointly a small fraction of a transmitted signal and a sinusoidal signal of a suitably chosen centre frequency produced by the microwave oscillator 2.

As discussed above, it is possible to replace a constant-delay line used in the time-delay discriminator 10 by a constant delay operating in the microwave region. This could be added between the coupler (CPL) 4 and the demodulator 3 of FIG. 14.

The use of random or chaotic binary waveforms offers excellent multi-user and anti-interference capability of the obstacle-detecting radar system. Moreover, because a random or chaotic signal source is used, mass-produced units (for example for vehicle-mounted obstacle detection) will be capable of generating unique and statistically independent signals which will not interfere with each other. However, the invention extends also to the use of deterministic and preferably at least substantially aperiodic signals.

In the obstacle-detection embodiments described above, microwave frequencies are used because this assists good focusing of a radar beam. However, other wavelengths could be used. It may indeed be desirable to radiate broadly, or omni-directionally, to provide an indication of the minimum distance of any obstacle, and it would be further possible to determine whether an obstacle is being approached by monitoring the change of the measured delay time. This could for example be useful for an assembly robot which might move in any direction in an automated factory.

In the embodiments described above, the sequence of events is derived from the reference signal, and this is used to sample the transmitted signal. This is the preferred arrangement, but these operations can be reversed, if desired. Also, in the above arrangements, differently-delayed versions of the sampled signal are created. However, this is not necessary. Instead, differently-delayed versions of the reference signal, or of the succession of events derived therefrom, can be used to sample the second signal.

The invention has many other uses beyond vehicle obstacle detection and ranging. For example, an altimeter can be arranged to operate in accordance with the principles of the invention. Furthermore, it is not necessary for only one of the signals to be transmitted. By way of example, a ground speed measuring device can be assembled by positioning two sensors at a fixed distance in the direction of travel and responsive to the same ground irregularities at different instants. By measuring the time delay between the detected irregularities, it would be possible to calculate the speed at which the sensors are travelling. This is one of many examples of situations in which the random or pseudo-random at least substantially aperiodic waveform results from an external characteristic, rather than being internally generated.

If the change in the delay time is measured, then velocity can be calculated. If the distance is known, then the delay time can be used to determine the speed of the transmission carrier. The technique may also be used for measurement of multiple objects (e.g. bulk material), in which case the signal is reflected from the respective objects and the reflections are superimposed, giving rise to multiple features in the combined segments of the received signal.

If desired, a pattern of delays could be detected, and, by repeating the measurement at a different location, velocity can be determined from the time between successive detections of the pattern.

Although in the embodiments described above the transmitter and receiver are in the same location, this is not essential.

The invention also extends to measuring parameters other than time. That is the two signals which are being compared do not necessarily represent variations with respect to time. The same operations as those described above can be performed, mutatis mutandis.

For example, the shift between two signals can represent linear or angular shift. In one specific example, a first signal may represent an image, for example a line through a two-dimensional video image. A second signal may represent a second version of the image, which is linearly shifted (translated) with respect to the first. Each signal could for example be a grey scale representation of a line across a video screen. One of the signals can be processed so as to obtain successive points each representing the intersection of the grey scale waveform with a particular reference level. These points can then be used for the sampling of different versions of the second signal, each version being associated with a different linear shift. The successive samples for each shift are integrated to produce a combined value, and these values are compared as in the embodiments described above. The amount of image movement can thus be determined in this way.

What is claimed is:

1. A method of determining the amount by which one signal is delayed with respect to another signal, the method comprising deriving from a first of the signals events occurring at non-uniform intervals, using each event to define a segment of the second signal, forming a representation of a combination of the segments and determining the delay amount from the position within the representation of a feature derived from combining parts of the second signal associated with the respective events derived from the first signal.

2. A method of measuring the amount by which one signal is delayed with respect to a corresponding signal, the method comprising deriving from a first of the signals events which are spaced apart by a succession of non-uniform intervals, using the events to trigger the sampling of a second of the signals, and combining the samples to derive a value which is influenced by the number of times the sampling has substantially coincided with parts of the second signal which correspond with respective events derived from the first signal, repeating the sampling with different delays between the second signal and the succession of events, and selecting the delay associated with the greatest degree of coincidence.

3. A method as claimed in claim 1, wherein the events are at least substantially aperiodic.

4. A method as claimed in claim 1, wherein one of the signals has been transmitted and received via a delay path, and the other signal comprises a reference signal, the method being used to determine the delay associated with the delay path.

5. A method as claimed in claim 4, when the method comprises calculating a distance measurement from the determined delay.

6. A method as claimed in claim 4, comprising calculating the speed of transmission from the determined delay.

7. A method as claimed in claim 4, wherein the reference signal is the first signal.

8. A method as claimed in claim 4, wherein the transmitted signal has a waveform which different from that of the reference signal.

9. A method as claimed in claim 1, wherein the step of driving the events from the first signal comprises determining when the signal crosses a predetermined threshold.

10. A method as claimed in claim 1, wherein the combination is formed by summing.

11. A method as claimed in claim 10, wherein the combination is formed by averaging.

12. A method as claimed in claim 1, wherein the second signal is a digital signal, and the parts of the second signal which correspond with said respective events comprise edges of the digital signal.

13. A method as claimed in claim 1, wherein the second signal is a bipolar signal, and the parts of the second signal which correspond with said respective events comprise zero crossings of the bipolar signal.

14. A method as claimed in claim 1, wherein the second signal is delivered to a delay line having multiple taps each providing a differently-delayed version of the second signal, and wherein the events derived from the first signal are used to couple each said tap to a respective combining means which is arranged to combine successive samples of the signal from the respective tap, the delay being determined by comparing the outputs of the combining means.

15. Apparatus for determining the delay between two corresponding signals, the apparatus being arranged to operate according to a method as claimed in claim 1.

16. Obstacle detection apparatus comprising a device fore measuring the delay between a transmitted signal and its reflection, the device being arranged to operate in accordance with a method as claimed in claim 1, and means for deriving from the delay an indication of the distance of an object from which the transmitted signal is reflected.

17. A method of measuring the shift between a first signal containing events at non-uniform intervals and a second signal containing features each associated with a respective event in the first signal, the method comprising combining segments of the second signal which are staggered by the distance between events and determining the position within the combination at which there is substantial coincidence of respective features.

18. A method as claimed in claim 17, wherein the events occur in a sequence which is at least substantially aperiodic.

19. A method of comparing two signals of corresponding profiles in order to determine the amount by which the profile of one signal is shifted with respect to that of the other signal, the method comprising deriving from a first of the signals a succession of points which are spaced apart by non-uniform intervals, sampling a second of the signals at parts determined by the points derived from the first signal, combining the samples to derive a value which is influenced by the number of times the sampling has substantially coincided with parts of the second signal which correspond to the respective points derived from the first signal, repeating the sampling with different values for the shift between the signals, and selecting the shift associated with the greatest degree of coincidence.

20. A method as claimed in claim 19, wherein the points occur in a sequence which is at least substantially aperiodic.

* * * * *